United States Patent
Pitocco et al.

(10) Patent No.: US 9,618,200 B2
(45) Date of Patent: Apr. 11, 2017

(54) RECUPERATOR FOR A RADIATING TUBE BURNER

(75) Inventors: Alphonse Pitocco, Vavincourt (FR);
Patrice Sedmak, Laimont (FR);
Stephane Magne, Poligny (FR)

(73) Assignee: FIVES STEIN (FR)

( * ) Notice: Subject to any disclaimer, the term of this patent is extended or adjusted under 35 U.S.C. 154(b) by 970 days.

(21) Appl. No.: 13/063,037

(22) PCT Filed: Sep. 4, 2009

(86) PCT No.: PCT/IB2009/053860
§ 371 (c)(1),
(2), (4) Date: Mar. 9, 2011

(87) PCT Pub. No.: WO2010/029477
PCT Pub. Date: Mar. 18, 2010

(65) Prior Publication Data
US 2011/0165528 A1 Jul. 7, 2011

(30) Foreign Application Priority Data

Sep. 10, 2008 (FR) .................................. 08 04970
Sep. 12, 2008 (FR) .................................. 08 05016

(51) Int. Cl.
*F23D 11/44* (2006.01)
*F23D 14/12* (2006.01)
(Continued)

(52) U.S. Cl.
CPC .............. *F23D 14/12* (2013.01); *F23C 3/002* (2013.01); *F23L 15/04* (2013.01)

(58) Field of Classification Search
CPC ................................. F23L 15/02; F23L 15/04
(Continued)

(56) References Cited

U.S. PATENT DOCUMENTS 2,638,889 A * 5/1953 Dow ....................... C21D 9/00
110/322
3,695,816 A * 10/1972 Oeppen et al. ............... 431/166
(Continued)

FOREIGN PATENT DOCUMENTS

DE          892738 C      10/1953
JP       H07305833        11/1995
(Continued)

OTHER PUBLICATIONS

Corresponding Korean Office Action for PCT/IB2009/053860 date Jan. 26, 2016.

*Primary Examiner* — Avinash Savani
*Assistant Examiner* — George R Blum
(74) *Attorney, Agent, or Firm* — The Belles Group, P.C.

(57) ABSTRACT

The invention relates to a heat recuperator (R) for a radiating tube burner having a burner pipe and an exhaust pipe (1), the recuperator being placed at the outlet of the exhaust pipe (1) and including a heat exchanger (E) that comprises: an outgoing section (5) for directing the air to be preheated to a ferrule (6), placed on the end of the recuperator, from the fume intake side, and a return section (7) opening towards a pipe (8) for supplying air from the burner, the assembly being provided such that part of the fumes are led through, and mix with, the combustion air; the heat exchanger (E) occupies only part of the cross-section of the exhaust pipe (1), the other part (1a) of the cross-section remaining free for the fumes; the combustion air is heated by the fumes in the outgoing section (5) and in the return section (7), being radially shifted outside the outgoing section (5) and immersed in the fumes.

13 Claims, 6 Drawing Sheets

(51) Int. Cl.
*F23C 3/00* (2006.01)
*F23L 15/04* (2006.01)

(58) Field of Classification Search
USPC .................................. 431/215, 166; 432/175
See application file for complete search history.

(56) References Cited

U.S. PATENT DOCUMENTS

| | | | | |
|---|---|---|---|---|
| 3,797,569 A * | 3/1974 | Meder | ................... | F28D 7/1669 165/169 |
| 3,908,628 A * | 9/1975 | Lazaridis et al. | ........... | 126/91 A |
| 4,038,022 A * | 7/1977 | Blackman | ............... | F23L 15/04 431/166 |
| 4,049,050 A * | 9/1977 | Mold | ................... | C03B 23/207 165/165 |
| 4,083,400 A * | 4/1978 | Dziedzic | ............... | F28D 9/0037 165/135 |
| 4,090,558 A * | 5/1978 | Akama | ................... | F23L 15/04 165/135 |
| 4,122,823 A * | 10/1978 | Hunter | ........................ | 126/117 |
| 4,310,303 A * | 1/1982 | Collier | ........................ | 432/209 |
| 4,330,031 A * | 5/1982 | Shefsiek | ........................ | 165/76 |
| 4,367,791 A * | 1/1983 | Asami | ...................... | F16L 9/19 165/109.1 |
| 4,380,429 A * | 4/1983 | LaHaye et al. | ............... | 431/115 |
| 4,410,037 A * | 10/1983 | Biro | ........................ | F23L 15/04 165/142 |
| 4,496,314 A * | 1/1985 | Clarke | ................... | F23C 3/002 126/91 A |
| 4,524,752 A * | 6/1985 | Clarke | ................... | F23C 3/002 126/91 A |
| 4,612,981 A * | 9/1986 | Palz | ......................... | F28F 21/04 165/158 |
| 4,673,350 A * | 6/1987 | Collier | ........................ | 431/353 |
| 4,800,866 A * | 1/1989 | Finke | ........................ | 126/91 A |
| 4,828,483 A * | 5/1989 | Finke | ........................ | F23C 6/045 431/11 |
| 4,877,396 A | 10/1989 | Wunning | | |
| 5,042,453 A * | 8/1991 | Shellenberger | ........... | 126/110 R |
| 5,241,949 A * | 9/1993 | Collier | ........................ | 126/91 A |
| 5,326,255 A * | 7/1994 | Wunning | ........................ | 431/215 |
| 5,406,933 A * | 4/1995 | Lu | ........................ | 126/110 R |
| 5,431,147 A * | 7/1995 | Tanaka et al. | ................. | 431/170 |
| 5,490,776 A * | 2/1996 | Miyama et al. | ............... | 431/215 |
| 5,516,499 A * | 5/1996 | Pereira et al. | ............. | 423/245.3 |
| 5,649,529 A * | 7/1997 | Lu | ........................ | F23M 9/06 126/110 R |
| 5,775,317 A * | 7/1998 | Finke | ....................... | F23C 3/002 126/91 A |
| 5,944,090 A * | 8/1999 | Teal | .................... | F28D 21/0008 165/47 |
| 6,190,159 B1 * | 2/2001 | Moore | .................... | F23C 3/002 126/91 A |
| 6,321,743 B1 * | 11/2001 | Khinkis et al. | ................. | 126/91 A |
| 7,762,807 B2 * | 7/2010 | Linck et al. | ................... | 431/215 |
| 8,062,029 B2 * | 11/2011 | Graf V. Schweinitz | ........... | F23C 3/002 126/91 A |
| 2003/0094208 A1 * | 5/2003 | Gabriel | ................... | F01N 13/08 138/120 |
| 2005/0014102 A1 * | 1/2005 | Harbeck et al. | ............... | 431/215 |
| 2005/0247300 A1 * | 11/2005 | Collier | ................... | F23C 3/002 126/91 A |
| 2008/0003531 A1 * | 1/2008 | Abbasi et al. | ................. | 431/215 |
| 2008/0014537 A1 * | 1/2008 | Atreya | ................... | F23G 7/065 431/5 |
| 2009/0269710 A1 * | 10/2009 | Linck | ..................... | F23C 3/002 431/2 |
| 2010/0112502 A1 * | 5/2010 | Wunning et al. | ............. | 431/215 |
| 2010/0119983 A1 * | 5/2010 | Wunning et al. | ............. | 431/11 |
| 2011/0111355 A1 * | 5/2011 | Sedmak | ....................... | 431/115 |
| 2011/0271881 A1 * | 11/2011 | Farmayan et al. | ............. | 110/205 |

FOREIGN PATENT DOCUMENTS

JP 2000199610 7/2000
WO WO-2008022722 A2 2/2008

* cited by examiner

RECUPERATOR FOR A RADIATING TUBE BURNER

CROSS REFERENCE TO RELATED APPLICATIONS

This application is a National Phase filing under 35 U.S.C. §371 of PCT/IB2009/053860 filed on Sep. 4, 2009; and this application claims priority to Application No. 0804970 filed in France on Sep. 10, 2008 under 35 U.S.C. §119, and claims priority to Application No. 0805016 filed in France on Sep. 12, 2008 under 35 U.S.C. §119; the entire contents of all are hereby incorporated by reference.

FIELD OF THE INVENTION

The invention relates to a recuperator for a radiant tube burner having a burner pipe and an exhaust pipe, the burner being positioned at the inlet of the burner pipe, the recuperator being positioned at the outlet of the exhaust pipe.

BACKGROUND

The recuperator at which the invention is aimed is of the kind which comprises a heat exchanger positioned inside a connecting pipe designed to be connected to the exhaust pipe so as to perform counter-current preheating of the combustion air by part of the flue gases, the exchanger comprising:
  an outbound section for directing the air that is to be preheated toward a ferrule positioned at the end of the recuperator at the flue gas inlet end,
  and a return section opening toward a line supplying the burner with air, the ferrule defining a path for reversing the direction of flow of the combustion air and directing it toward the return section,
the assembly being designed so that part of the flue gases is entrained by and mixed with the combustion air so as to reduce the level of nitrogen oxides in the products of combustion.

A heat recuperator of this kind is disclosed in FR-A-2 780 770. In general, the radiant tubes with burner are equipped with a system for recuperating heat from the flue gases, this system being of the finned exchanger type.

WO 2008/022722 also discloses a heat recuperator in which the outbound section is surrounded by the return section. The combustion air is heated by the flue gases only during the return path.

Recuperators proposed hitherto need to be improved in order:
  to improve their thermal performance and the transfer of heat between the flue gases and the combustion air,
  to increase the level of recirculation of flue gases in the combustion air so as to reduce emissions of nitrogen oxides and improve the temperature uniformity of the radiant tube,
  to limit pressure drops so as to reduce the required pressure for the combustion air and the extraction needed to carry away the flue gases,
  to gain control over pressure drops,
  to make the cold ignition of the burner more reliable,
  and to reduce the cost of manufacture.

SUMMARY OF THE INVENTION

According to the invention, a heat recuperator for a radiant tube burner having a burner pipe and an exhaust pipe, the burner being positioned at the inlet of the burner pipe, the recuperator being positioned at the outlet of the exhaust pipe, and comprising a heat exchanger positioned inside a connecting pipe designed to be connected to the exhaust pipe so as to perform counter-current preheating of the combustion air by part of the flue gases, the exchanger comprising:
  an outbound section for directing the air that is to be preheated toward a ferrule positioned at the end of the recuperator at the flue gas inlet end,
  and a return section opening toward a line supplying the burner with air, the ferrule defining a path for reversing the direction of flow of the combustion air and directing it toward the return section,
the heat exchanger occupying just part of the cross section of the connecting pipe, the other part remaining free for the passage of the flue gases toward a discharge,
the assembly being designed so that part of the flue gases is entrained by and mixed with the combustion air,
is characterized in that:
  the outbound section of the exchanger comprises a plurality of exchanger tubes which are parallel to the axis of the connecting pipe, for the passage of the combustion air, the flue gases exchanging heat with the air across the exchanger tubes, the two fluids having parallel flows in opposite directions,
  the exchanger tubes open to the inside of the ferrule,
  the air circuit is configured in a "hairpin" shape, the return section being radially offset in relation to the tubes of the outbound section and the cross sections of the exchanger tubes and of the return section being situated on the outside of one another.

The preheating of the air by the flue gases continues in this return section through a direct exchange of heat resulting from the mixing of the air with hotter flue gases and through an indirect exchange of heat with the flue gases circulating around the return section.

Advantageously, the exchanger tubes are grouped together in a region of the space contained between the return section and the connecting pipe or the exhaust pipe. The return section may be formed of a tube of a cross section large enough for the flow of the air from the exchanger tubes and of the recirculated part of the flue gases.

According to one first possibility, the tube of the return section is connected fluidtightly to the ferrule, the other axial end of the tube being closed, the return section opening out transversely by an ejector positioned facing the line supplying the burner with air.

According to another possibility, the tube of the return section is opened at the flue gas inlet end and the ferrule has a curved crook-shaped outlet nozzle that combines the flows of the collecting tubes and opens into the open end of the return section, in which the air and part of the flue gases become mixed. The return section may be curved, particularly at a right angle, where it leaves the connecting pipe.

The recuperator may comprise an air inlet line surrounded by a tubular jacket closed at its inner end and open at its other end into an air inlet chamber for the exchanger tubes, the tubular jacket being surrounded by flue gases so that the combustion air makes a first, preheating, outward and return trip before entering the exchanger tubes.

The ferrule may comprise a cylindrical part extended upstream by a funnel which is connected to the mixing tube, the funnel in its central part comprising a tubular extension that forms an injector for the combustion air, this extension being supported by radially directed cuffs placing an annular space into which the exchanger tubes open in communication with the inside of the tubular extension.

The recuperator is advantageously of all-welded construction with tubular elements and sheet metal components made of stainless steel. A helicoid may be positioned in at least one exchanger tube.

The exchanger tubes may be surrounded by jacket tubes, the combustion air flowing through the exchanger tubes while the flue gases flow through the annular passages contained between the exchanger tubes and the jacket tubes. A partition through which the jacket tubes pass in a fluidtight manner may be provided for the purposes of delimiting, at the end of the connecting pipe or the exhaust pipe, a chamber connected to the flue gas discharge, the jacket tubes opening into this chamber.

The recuperator may comprise a bypass pipe for short-circuiting part of the cold air directly to the burner without passing via the recuperator as long as the radiant tube has not reached the self-ignition temperature of the fuel, with a shut-off member provided on the air intended for igniting the burner.

The exchanger tubes may have different diameters with, for example, a larger diameter in the upper part and a smaller diameter in the lower part. For preference, the exchanger tubes are welded at just one end, the hot end connected to the ferrule, while at the other end they are engaged with a fluidtight sliding fit in a wall.

The exchanger tubes are carefully set out to optimize the bore sections through which the fluids pass, for example in an arc of a circle centered on the axis of the exhaust pipe, and so as to reduce the pressure drop in the flue gases flowing through the free section.

In an alternative form, the collection of exchanger tubes is surrounded by a jacket wall and the flue gases flow through the region contained between the exterior surface of the exchanger tubes and the jacket wall. This alternative form is better suited to operation with gas of the steel plant type (the type with gases from a coke-fired furnace and gases from blast furnaces) because of the enormous volumes of flue gases created.

BRIEF DESCRIPTION OF THE DRAWINGS

Apart from the provisions set out hereinabove, the invention consists of a certain number of other provisions that will be tackled more fully hereinafter with regard to some exemplary embodiments described with reference to the appended drawings, but which are not in any way limiting. In these drawings.

DETAILED DESCRIPTION

Figure 1:
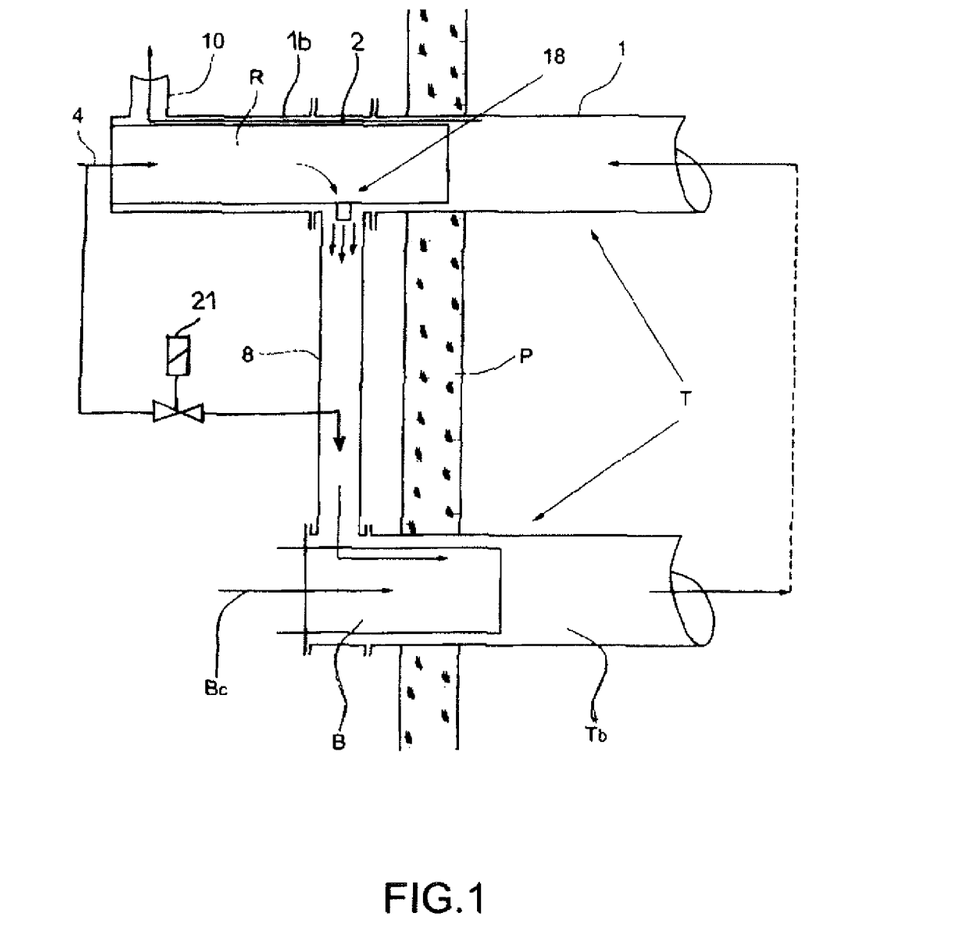
FIG. 1 is a schematic partial vertical section through a furnace equipped with a heat recuperator burner.

The drawings, notably FIG. 1, show a burner B of the radiant tube T type. The tube T comprises a burner pipe Tb at the inlet of which the burner B is installed. The tube T passes through a wall P of a furnace, extends into the chamber of the furnace and emerges through the wall via an exhaust pipe 1. The burner B is supplied with fuel by a pipe Bc. The flame of the burner B develops in the radiant tube T and the flue gases (combustion gases) pass through this tube to heat the furnace. The flue gases are directed, in the tube T, toward the pipe 1.

A heat recuperator R is positioned at the outlet of the exhaust pipe 1. As may be seen in FIG. 2, the recuperator R comprises a heat exchanger E positioned inside a connecting pipe 1b designed to be connected by a flange (not depicted in FIG. 2) to the exhaust pipe so as to perform counter-current preheating of the combustion air by a part 2 of the flue gases leaving via the exhaust.

Figure 2:
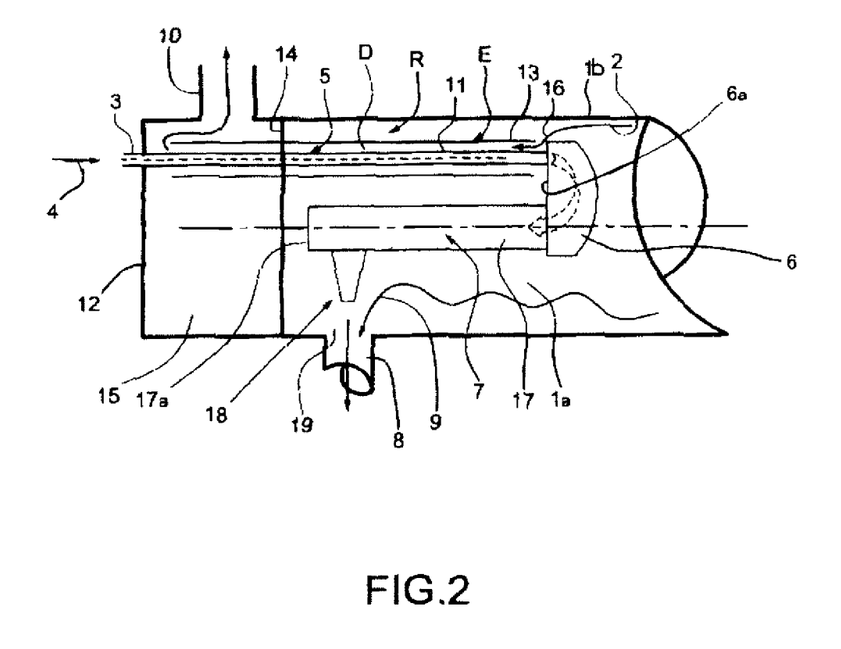
FIG. 2 is a schematic vertical axial section, with parts shown in exterior view, of a heat recuperator according to the invention.

The cold combustion air enters the exchanger E via one end 3 in the direction of the arrow 4 and is directed, by an outbound section 5 of the exchanger, toward a ferrule 6 positioned at the end of the recuperator that is the flue gas inlet end. The exchanger E comprises a return section 7 opening toward a line 8 that supplies the burner with air. The ferrule 6 defines a path for reversing the direction of flow of the combustion air from the outbound section 5 and for directing it toward the return section 7.

The assembly is designed so that a part 9 of the combustion flue gases is entrained by the air with which the burner is supplied and becomes mixed with this air in the line 8.

The heat exchanger E occupies just part of the cross section of the connecting pipe 1b, or of the exhaust pipe 1, as is clearly visible in FIG. 2. The other part 1a of the cross section remains free. The return section 7 of the exchanger is radially offset in relation to the outbound section 5. The outbound 5 and return 7 sections are respectively on the outside of one another. The return section 7 is bathed in the part 9 of the flue gases.

The combustion air is heated up, in the outbound path 5, by the flue gases across the wall of the outbound section 5 surrounded by the flue gases. The heating-up of the air by the flue gases continues during the return path through the wall of the return section 7.

Figures 7, 8:
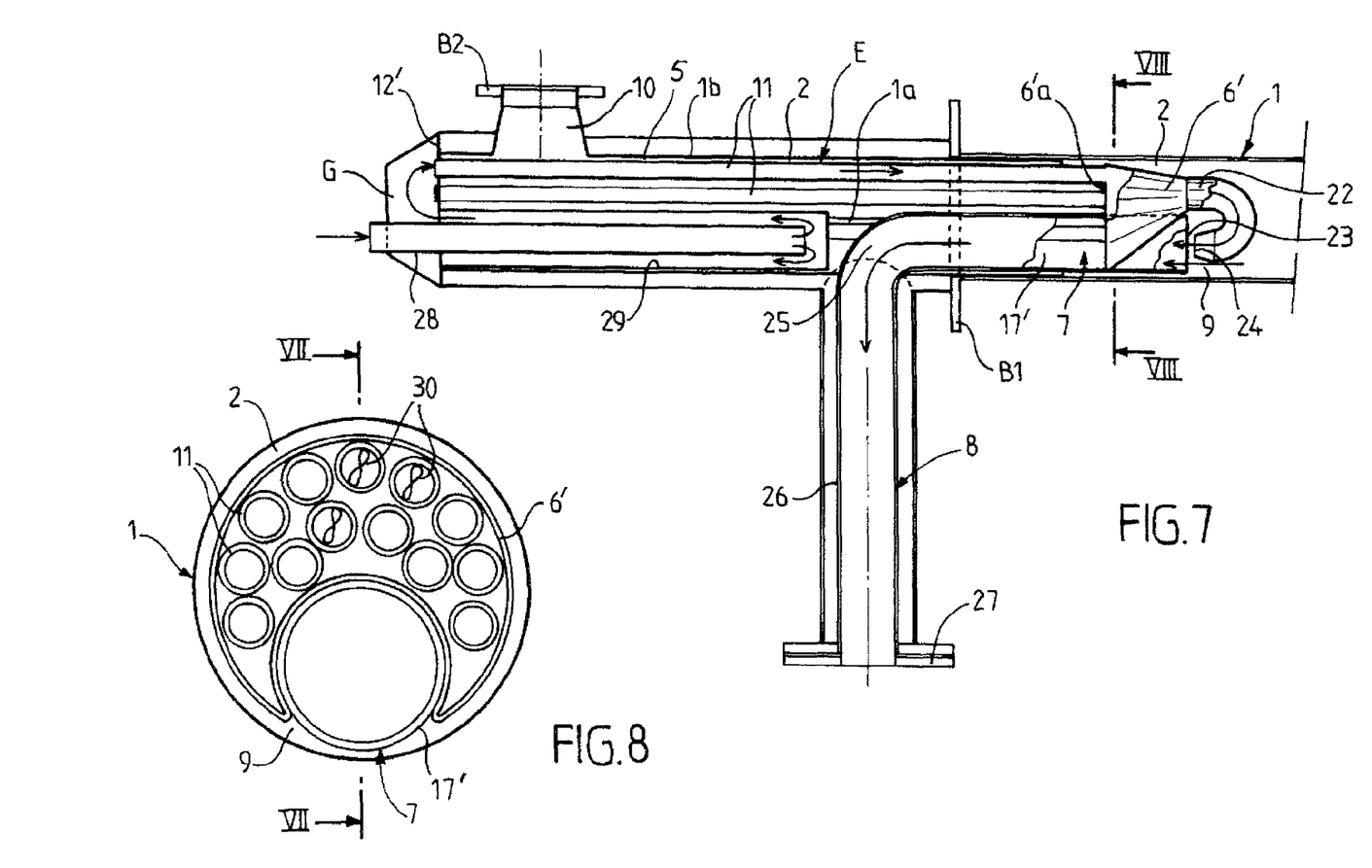
FIG. 7 is a schematic vertical axial section on VII-VII of FIG. 8 of an alternative form of the heat recuperator according to the invention, with partial cut-away.
FIG. 8 is a cross section, on a larger scale, on VIII-VIII of FIG. 7.

The upstream part of the recuperator situated in the region of the ferrule 6 is designed to separate the flue gases into the part 2 that will be discharged by an outlet 10 and the part 9 which will be mixed with the combustion air. The outlet 10, as illustrated in FIG. 7, is equipped with a connecting flange B2 for connection to a chimney (not depicted). The part 9 of the flue gases flows through the free section 1a between the exchanger E and the internal surface of the connecting pipe 1b or of the exhaust pipe 1.

The recuperator comprises a passage D for guiding the part 2 of the flue gases from upstream of the exchanger E to the outlet 10.

Figure 3:
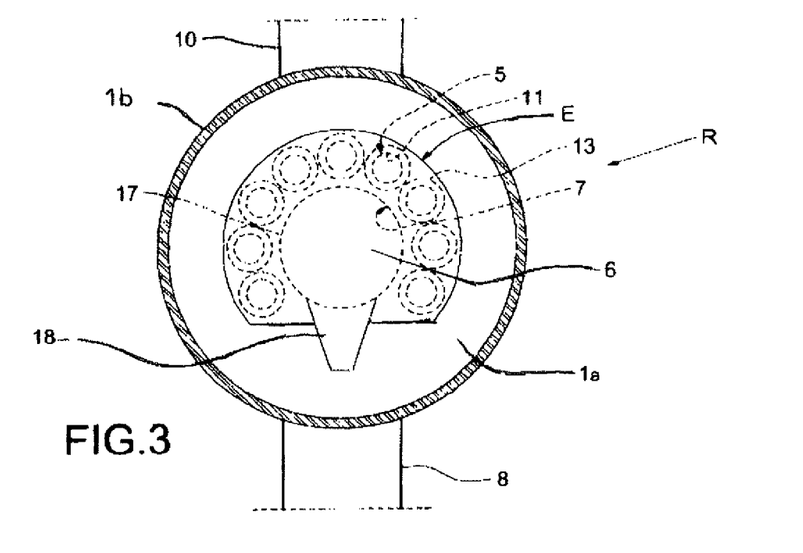
FIG. 3 is a schematic view from the right in relation to FIG. 2, on a larger scale.

As shown by FIGS. 2 and 3, the outbound section 5 of the exchanger comprises a plurality of exchanger tubes 11 which are parallel to the geometric axis of the pipe 1b and of the pipe 1. The centers of the cross sections of the tubes 11, in a first exemplary embodiment, are positioned on an arc of a circle centered on the axis of the pipe 1 as may be seen in FIGS. 3 and 4, this arc of a circle extending over a little more than 180°. The exchanger tubes 11 are designed for the passage of one of the fluids: combustion air or flue gases. In the example illustrated in FIGS. 2 to 4, the exchanger tubes 11 are designed for the passage of the combustion air and pass fluidtightly through a transverse end wall 12 closing off the downstream (in the direction of flow of the flue gases) part of the pipe 1b. The combustion air inlet comprises a distributor box (not depicted) communicating with the various ends 3 of the tubes 11 projecting out of the wall 12. At this location sealing is provided against the tubes 11 in a sliding manner so that thermal expansion is not impeded. That then allows the tubes to become elongated independently of one another.

Figure 4:
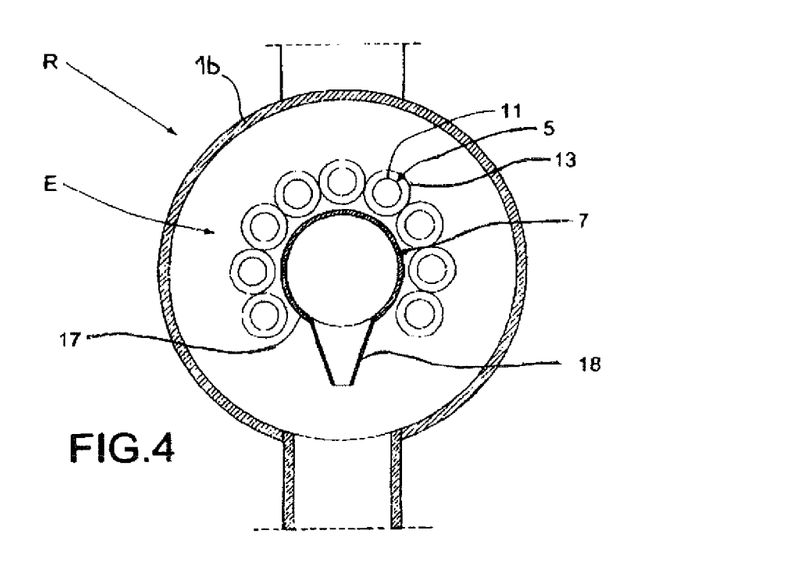
FIG. 4 is a schematic view in section through the injector 18 according to FIG. 3.

In FIGS. 2 to 4, the exchanger tubes 11 are surrounded individually by coaxial jacket tubes 13 which fluidtightly pass through a partition 14 that closes off the pipe 1b upstream of the outlet 10. A discharge chamber 15 is formed between the partition 14 and the wall 12, this chamber 15 communicating with the outlet 10. The jacket tubes 13 are positioned a certain radial distance away from the internal surface of the pipe 1, and stop short of the wall 12 so as to open out into the chamber 15. At their other end, the jacket tubes 13 stop some distance from a transverse end wall 6a of the ferrule 6 so that an annular space 16 is created between the upstream end of each tube 13 and the ferrule 6, allowing the part 2 of the flue gases to enter the annular passages D contained between the exterior surface of the exchanger tubes 11 and the interior surface of the jacket tubes 13. The discharged part 2 of the flue gases leaves the tubes 13 at the downstream end and is exhausted by the outlet 10.

In the exemplary embodiment of FIG. 3, the ferrule 6 has an outline in the form of an arc of a circle, a radial distance from the internal surface of the pipe 1b. The exchanger tubes 11 open into the ferrule 6. The ends of the tubes 11 are preferably welded against the wall 6a pierced with holes one in line with each tube 11.

The return section 7 is formed of a cylindrical tube 17 the axis of which runs parallel to the axis of the pipe 1b. The cross section of the tube 17 is preferably at least equal to the sum of the cross sections of the exchanger tubes 11. The wall 6a comprises a port communicating with the tube 17 connected fluidtightly, preferably by welding, to this wall 6a. The other axial end of the tube 17 is closed off by a wall 17a near the partition 14.

At its end near the wall 17a, the tube 17 is equipped with a transverse ejector 18 of preheated air. This ejector is formed by a frustoconical nozzle the cross section of which decreases toward the outside, and the purpose of which is to blow preheated air toward the burner via the line 8. The ejector 18 stops a certain distance short of the pipe 1b or of the pipe 1 so that there is an annular region 19 left between the outlet of the ejector 18 and the inlet of the line 8. The air leaving the ejector 18 creates a suction effect aspirating the part 9 of the flue gases and entraining it along the supply line 8.

The exchanger E may be produced completely out of tubes and sheet metal panels made of stainless steel.

The way in which the recuperator R works is as follows.

The cold air for combustion flows and is heated up in the exchanger tubes 11 counter-currentwise in relation to the part 2 of the hot flue gases which flow along the passages D between the tubes 11 and the jacket tubes 13. The direction in which the preheated air flows is reversed in the ferrule 6 and the air returns to the ejector 18 along the return section 7 lying in the part 9 of the hot flue gases. The preheating of the air continues in this return section 7. The preheated air leaves via the ejector 18 and becomes mixed with the part 9 of the flue gases that have been carried along the pipe 8.

Figure 5:
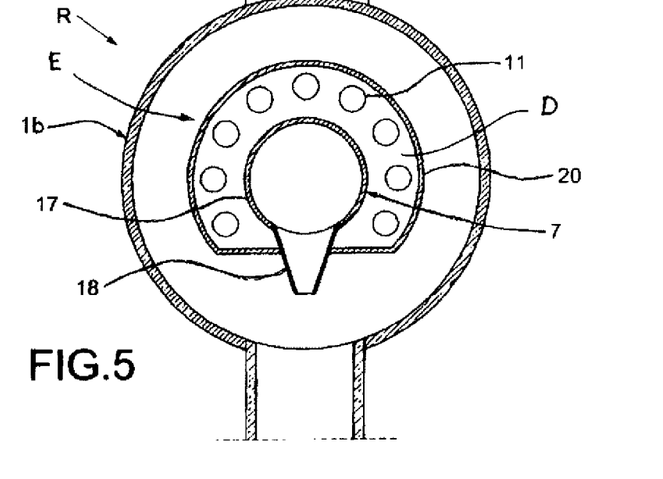
FIG. 5 is a view similar to FIG. 4 of an alternative form of embodiment.

FIG. 5 shows an alternative form of embodiment in which the collection of exchanger tubes 11, through which the combustion air that is to be preheated flows, is surrounded by a communal outer jacket 20. The flue gases flow through the passage D contained between the outer jacket 20 and the exterior surface of the tubes 11. The return section 7 is equipped with the ejector 18. The entire exchanger assembly E of FIG. 5 is installed in the connecting pipe 1b or the exhaust pipe 1. This configuration allows greater volumes of flue gases because of its low pressure drop and therefore lends itself well to use with lean steelworks fuels.

Figure 6:
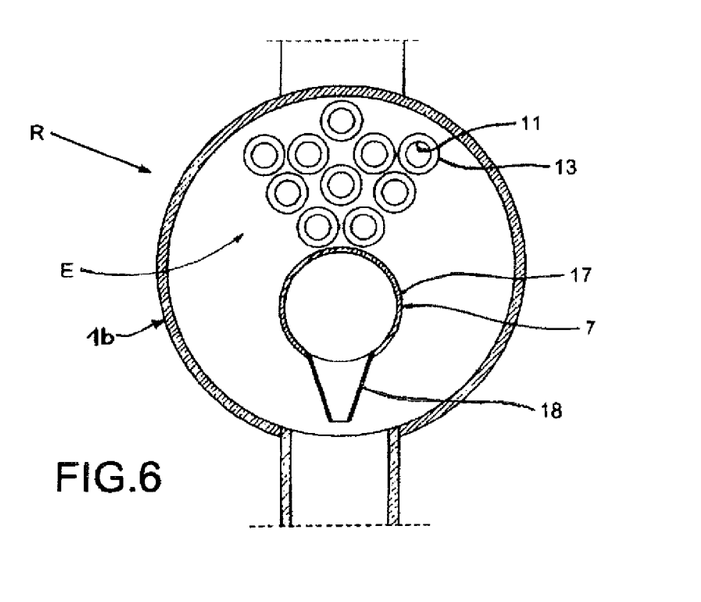
FIG. 6 is a view similar to FIG. 4 of another alternative form of embodiment.

FIG. 6 shows another alternative form of embodiment with a different arrangement of exchanger tubes, the purpose of this being to increase the exchange area without increasing the pressure drop of the recirculated flue gases. The exchanger tubes 11, 13 are grouped together in a region of the space contained between the section 7 and the pipe 1. This configuration makes it possible to increase the number of exchanger tubes in the exhaust pipe and allows greater preheating of the combustion air without reducing the proportion of flue gases that is recirculated.

The flow rates of flue gases and of combustion air flowing through the exchanger tubes are constant for all the alternative forms of embodiment according to the invention because they are dependent solely on the way in which the burner is operating. With an additional tube according to the alternative form of FIG. 6, the rate of flow of the gases through the tubes is slightly lower but the exchange area is higher. Because area is of greater importance in the amount of heat exchanged by convection than speed, in our operating range, this results in greater thermal efficiency for the exchanger according to the exemplary embodiment of FIG. 6 in spite of a lower speed at which the flue gases and combustion air flow.

It will be readily understood that it is necessary to optimize in order to achieve the best compromise between exchange area (number, diameter and length of tubes) and flow rates so as to obtain a good balance between size and pressure drop.

In the alternative form of embodiment according to FIG. 6, the return section 7 is no longer centered in the exhaust pipe but is offset downward so that the exchanger tubes lie in the upper part.

The way in which the exchangers of FIGS. 5 and 6 work is similar to the operation of the exchanger of FIGS. 2 to 4.

Advantageously, provision is made for part of the cold air to be short-circuited (bypassed) directly to the burner without passing via the recuperator as long as the radiant tube has not yet reached the self-ignition temperature of the fuel. This short-circuit (bypass) system requires the use of a shut-off member 21 (FIG. 1) for shutting off the air intended for igniting the burner.

FIGS. 7 and 8 show another alternative form of embodiment of the recuperator according to the invention. Elements which perform the same function to those described in the preceding embodiments are denoted by the same numerical references, possibly followed by an apostrophe '.

These will not be described again or will be described again only briefly. The exchanger tubes 11 extend, in the connecting pipe 1b, from an end wall 12' situated to the left in FIG. 7, through which they pass fluidtightly with the possibility of sliding, to open into an air inlet chamber G for the tubes 11. These exchanger tubes 11 are not surrounded by coaxial jacket tubes. According to FIG. 7, the pipe 1b is equipped with a flange B1 for connection to the pipe 1. The exchanger E projects partly beyond the flange B1 and this projecting part is engaged in the pipe 1 coaxial with the pipe 1b. As may be seen in FIG. 8, the tubes 11 are grouped in a crescent-shaped space contained between the wall of the pipe 1 or, as the case may be, of the pipe 1b, and the tube 17' that forms the return section 7.

The ferrule 6' is in the shape of a cone frustum with a large base consisting of the plate 6'a which has openings corresponding to the cross sections of the tubes 11. These tubes 11 are welded to the plate 6'a to open fluidtightly into the ferrule 6'. The small base of the ferrule 6' is connected to a crook-shaped nozzle 22 constituting a 180°-bend outlet which combines the flows of air from the various tubes 11.

The end 23 of the return section 7 (tube 17') is open facing the end 24 of the crook 22. Air leaving the crook 22 enters the tube 17' and becomes mixed with the part 9 of flue gases, coming from upstream, which enters this tube 17'. The mixing of the air with part of the flue gases makes it possible to lower the oxygen content in the oxidant and this has the effect of reducing the NOx formed at the time of combustion. This mixing also plays a part in heating up the air.

Part of the flue gases enters the empty space 2 situated around the ferrule 6', between this ferrule and the internal surface of the pipe 1 or of the pipe 1b. This part of the flue gases flows around the tubes 11, notably in the space 1a, in the direction of the outlet 10, counter-current in relation to the air in the tubes 11. The tube 17' is also surrounded by flue gases heading toward the outlet 10.

The tube 17' emerges laterally from the connecting pipe, being bent over at a right angle into a bend 25 extended by an outlet nozzle 26 fitted, at its free end, with a flange 27 for connecting to the air nozzle (not depicted) of the burner.

Air may enter the tubes 11 directly by the chamber G. However, in the exemplary embodiment depicted, air inlet is via a line 28 passing through the wall 12' and surrounded, in the space in which the flue gases are to be found, by a tubular jacket 29, closed at its inner end, near the elbow 25. The line 28 stops short of the interior end of the tubular jacket 29 and is open so as to allow the air that has entered to change direction by 180° to return toward an opening in the wall 12' around which the tubular jacket 29 is fluidtightly attached.

Because the jacket 29 is surrounded by flue gases, the air circulating in return between the line 28 and the interior wall of the jacket 29 experiences a first preheating before arriving in the chamber G.

This outbound and return trip performed by the air entering the double tube consisting of the line 28 and the tubular jacket 29 is optional. When present, it offers an energy saving and an improvement in efficiency at the expense of an increase in pressure drop.

To improve efficiency and encourage exchanges of heat, strips of metal twisted into helicoids 30 may be provided inside the tubes 11 as illustrated in FIG. 8.

The operation of the heater of FIGS. 7 and 8 is similar to that described with reference to the preceding figures.

The arrows drawn in FIG. 7 embody the paths followed by the air and by the flue gases.

According to the optional alternative form, the air entering by the line 28, having made an outbound and return trip, returns to the chamber G and enters the exchanger tubes 11, of which there are thirteen in the example of FIG. 8. The air is heated up in these tubes 11 by exchange of heat with the flue gases licking the exterior surface of the tubes 11, counter-currentwise.

The air thus heated up is collected in the ferrule 6' and makes an about-turn in the part 22 to enter the tube 17'. It is at this point that the recirculation of flue gases takes place. By thus shifting the injector formed by the crook 22 to the end of the recuperator, maximum recirculation effect efficiency can be had.

The thirteen tubes 11 are bathed in the flue gases which naturally pass rather in the lower part which constitutes a preferred path. In order to limit the preferred paths of the flue gases and better fill the available space, the tubes 11 may have different diameters, for example a larger diameter in the upper part and a smaller diameter in the lower part of the cross section. The number of tubes 11 will also be adapted to suit the dimensions of the recuperator.

Differential expansions between tubes 11 may occur because these tubes are welded only at the hot end, corresponding to the plate 6'a. At the other end, the tubes 11 are slidingly engaged in the wall 12' which preferably consists of three plates separated by an insulator.

Figure 9:
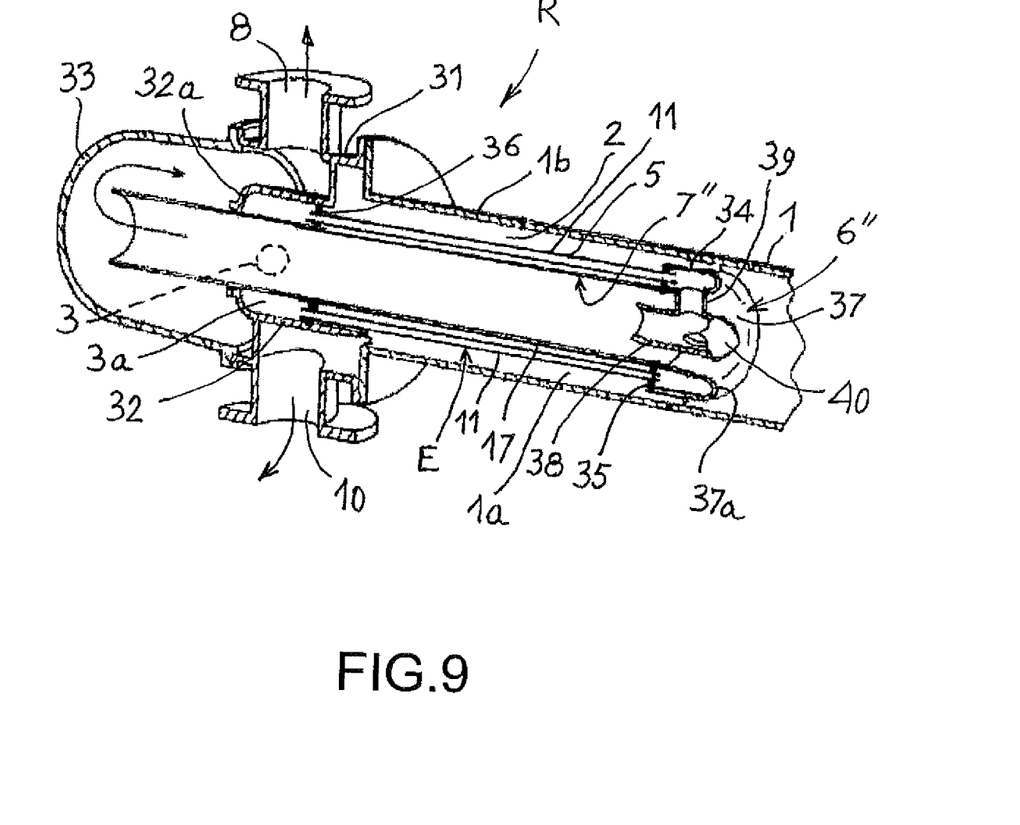
FIG. 9 is a perspective view, in vertical axial section, of another alternative form of recuperator according to the invention.

FIG. 9 shows another exemplary embodiment of a heat recuperator according to the invention. Elements which are identical or similar to elements already described before are denoted by the same references, possibly followed by " and these will not be described again or will be described again only briefly.

FIG. 9 shows that the recuperator R comprises a cylindrical body 31 coaxial with the exhaust pipe 1 connected to this body. The inlet for combustion air 3, provided on the non-visible part of the body situated on the other side of the vertical plane of section, has a horizontal axis orthogonal to the axis of the body 31 and of the pipe 1. The outlet 10 of the remainder of the products of combustion has a vertical axis and is directed downward while the outlet 8 of the mixture consisting of the combustion air and part of the products of combustion is directly opposite the outlet 10. The inlet 3 and the outlets 8 and 10 are equipped with a collar that forms a flange for connection to a line.

As may be seen in FIG. 9, the body 31 comprises internal partitions separating various regions which communicate with the inlet 3 and the outlets 8 and 10. The inlet 3 communicates with an interior chamber 3a determined by a cylindrical partition 32 that has a transverse end wall 32a through which the return section 7", formed by the mixing tube 17 extending downstream beyond the end wall 32a, passes in a sufficiently fluidtight fashion. A cap 33 coaxial with the tube 17 is fixed to the body 31, notably by a flange, not depicted, to cap the downstream end of the tube 17. The annular space contained between the exterior surface of the tube 17 and the interior surface of the cap 33 communicates with the outlet orifice 8 for the mixture of combustion air and products of combustion. The direction in which this mixture flows is reversed through 180° at the outlet of the tube 17 to head toward the outlet 8.

The ferrule 6" (FIG. 9) comprises a cylindrical part 34. The downstream end of this part 34 is formed by a circular ring 35 fitted tightly onto the tube 17 and tightly surrounded by the part 34. The exchanger tubes 11 are distributed around the mixing tube 17, parallel thereto, and open into the ferrule 6" via openings provided in the ring 35. At their other end, the tubes 11 open through a circular ring 36 into the air inlet chamber 3a. The upstream end of the cylindrical part 34 is equipped with a funnel 37 the upstream peripheral edge 37a of which is bent over at 180°. The wall of the funnel 37 forms a substantially frustoconical skirt starting from the bent-over edge 37a and provides a connection between the upstream edge of the part 34 and the smaller-diameter mixing tube 17. The tube 17 that constitutes the return section is radially offset toward the inside in relation to the tubes 11 surrounding it.

An injector-forming tubular extension 38, projecting into the tube 17, is coaxial with the funnel 37 to which it is secured by hollow cuffs 39, directed radially, open at each end. The cuffs 39 open toward the outside into the space into which the tubes 11 open and, toward the inside, into the extension 38 via openings of elongate shape. The tubular extension 38 is shut off, at the upstream end, by an ogee shape 40 which directs the recirculated part of the products of combustion toward the tube 17 via passages surrounding the cuffs 39 and contained between the internal surface of the funnel 37 and the external surface of the tubular element 38.

It is possible for the exchanger tubes 11 to be welded only at their cold end, it being possible for the ferrule 6" to be held in position by the inner tube 17.

The operation of the recuperator of FIG. 9 is similar to that described for the preceding figures.

The combustion air flows counter-currentwise through the tubes 11 parallel to the tube 17, enters the cylindrical part 34 then flows radially inward via the cuffs 39 into the tubular element 38 and is injected axially into the tube 17 in the opposite direction to the direction of flow in the tubes 11.

The products of combustion pass, in part, through the annular space 2 toward the outlet 10 and, for another part, directly into the passages between the cuffs 39, with a minimum pressure drop, to mix in the tube 17 with the combustion air. In the example of FIG. 9, the ferrule 6" comprises three cuffs 39 positioned 120° apart.

A narrowing in cross section at the end of the injector 38 leads to an increase in the velocity of the air which causes it to aspirate the products of combustion.

The combustion air flows through the tubes 11 in the opposite direction to the products of combustion flowing through the section 2 and thereby improves the exchanges of heat between the two fluids and the temperature profile of the recuperator by decreasing the differences in temperature between one end and the opposite end.

The risks of breakage encountered in conventional recuperators are logically reduced because of the counter-current mode of recuperation which gives rise to less violent thermal shocks.

Finally, not using a casting makes it possible to reduce the risk of breakage.

The recuperator/burner can be thermally insulated at the time of its manufacture, so that no thermal insulation has to be provided on site. On-site assembly is reduced to three connecting flanges 27, B1, B2.

The recuperator according to the invention makes it possible simultaneously to improve the exchange of heat between air and flue gases and the level of flue gases recirculated, passing through the supply line 8. The use of straight tubes in the exchanger gives rise to limited and well controlled pressure drops.

The choice of the various diameters for the tubes is governed both by mechanical performance and by in-line pressure drops (tube thickness) but is also dictated by the ease with which the tubes can be sourced. As a result, it is appropriate to opt for standard commercially available tube sizes.

The part 9 of the flue gases enjoys a large free cross section 1a so that the speed of the flue gases remains low therein. Although the overall pressure drop in the combustion flue gases varies little, whatever the geometry of the return circuit, it does have a direct influence on the level of recirculation of the flue gases by altering the pressure drop on that part of the flue gases that is circulating through the free section 1a.

The greater the volume of recirculated flue gases, the higher the speed of the gases in the radiant tube. This increase in speed nonetheless leads to only a small variation in the pressure drop in the tube.

The design according to the invention makes it possible to separate the flue gases upstream of the exchanger, and this:
- means the flue gases can have their speed increased in the passages around the exchanger tubes 11, so as to increase the efficiency of the heat exchangers;
- leads to a limiting of the pressure drops in the flue gases recirculated with an increase in the effectiveness of the ejector 18.

The use of tubes 11, 13, 17, 17' according to the invention makes it possible to gain control over the speeds of the fluids and therefore fix the heat exchanges and pressure drop so that they are repeatable, something which generally cannot be done with conventional recuperators which are produced from castings with appreciable differences in bore sections as a result of manufacturing tolerances.

Counter-current circulation improves the exchange of heat between the fluids while at the same time reducing the mechanical stresses by reducing the temperature gradient between the flue gases and the combustion air on the inlet side of the recuperator.

The tubular design also allows the recuperator to be lengthened, resulting in a larger area for heat exchange and better recuperation of heat.

The recuperator of the invention, which is of all-welded construction, is more lightweight than a recuperator produced from castings. In addition, the quality of the refractory stainless steel can be tailored to each component of the recuperator assembly according to the level of temperature to which it is subjected, making it possible to achieve an overall reduction in the material cost of the recuperator.

The invention claimed is:

1. A heat recuperator for a radiant tube burner having a burner pipe and an exhaust pipe, the burner being positioned at the inlet of the burner pipe, the heat recuperator comprising:
    a connecting pipe having a first end and a second end, the first end coupled to the outlet of the exhaust pipe such that flue gases flow from the first end of the connecting pipe toward the second end;
    a heat exchanger positioned inside and occupying a first part of a cross section of the connecting pipe, a second part of the cross section remaining free for the passage of the flue gases toward a discharge of the connecting pipe, the heat exchanger comprising:
        an outbound section for directing air for combustion from an inlet at the second end of the connecting pipe toward the first end of the connecting pipe, the outbound section comprising a plurality of exchanger tubes arranged parallel to the axis of the connecting pipe for the passage of air for combustion, each exchanger tube including a tube wall, at least part of each tube wall forming a boundary between the air for combustion flowing toward the first end of the connecting pipe and at least part of the flue gases flowing toward the second end of the connecting pipe, such that the part of the flue gases provide counter-current preheating of the air for combustion across the tube walls;
        a ferrule positioned at the end of the heat exchanger nearest the first end of the connecting pipe and coupled to the plurality of exchanger tubes of the outbound section, the exchanger tubes opening to the inside of the ferrule; and a return section having an ejector end opening toward a line supplying the burner with air and an open end opposite the ejector end facing the ferrule, the return section being formed of a single tube which is radially offset in relation to the exchanger tubes of the outbound section, the cross sections of the plurality of exchanger tubes and of the single tube of the return section being situated on the outside of one another, and the cross section of the single tube of the return section being at least equal to the sum of the cross sections of the plurality of exchanger tubes, wherein:

the ferrule is configured to reverse the direction of flow of the air for combustion from the plurality of exchanger tubes into the single tube of the return section, the air for combustion within the single tube of the return section flows from the ferrule toward the second end of the connecting pipe, the single tube of the return section includes an open end at the end of the heat exchanger nearest the first end of the connecting pipe, and the open end of the single tube of the return section is spaced apart from the ferrule, such that the open end is fluidically coupled with the ferrule and with the flue gas inlet end of the exhaust pipe to entrain and mix part of the flue gases with the combustion air at the open end of and within the single tube of the return section.

2. The recuperator as claimed in claim 1, wherein the ferrule comprises an inlet curving toward an outlet, the inlet combining the flows from the plurality of exchanger tubes and the outlet opening into the open end of the return section.

3. The recuperator as claimed in claim 2, wherein the ejector end of the return section is curved near the first end of the connecting pipe.

4. The recuperator as claimed in claim 2, further comprising an air inlet line surrounded by a tubular jacket closed at its inner end and open at its other end into an air inlet chamber for the exchanger tubes, the tubular jacket being surrounded by flue gases so that the combustion air makes a first, preheating, outward and return trip before entering the exchanger tubes.

5. The recuperator as claimed in claim 1, wherein the ferrule comprises a cylindrical part extended upstream by a funnel which is connected to the return section, the funnel in its central part comprising a tubular extension that forms an injector for the combustion air, this extension being supported by radially directed cuffs placing an annular space into which the plurality of exchanger tubes open in communication with the inside of the tubular extension.

6. The recuperator as claimed in claim 1, wherein it is of all-welded construction with tubular elements and sheet metal components made of stainless steel.

7. The recuperator as claimed in claim 1, wherein a helicoid is positioned in at least one of the plurality of exchanger tubes.

8. The recuperator as claimed in claim 1, wherein each of the plurality of exchanger tubes is surrounded by a jacket tube to form an annular passage therebetween, the combustion air flowing through the plurality of exchanger tubes while the flue gases flow through the annular passages.

9. The recuperator as claimed in claim 8, wherein each jacket tube passes in a fluidtight manner through a partition which delimits, at the end of the connecting pipe, a chamber connected to the flue gas discharge, each jacket tube opening into this chamber.

10. The recuperator as claimed in claim 1, wherein the plurality of exchanger tubes is surrounded by a jacket wall and the flue gases flow between the exterior surface of the plurality of exchanger tubes and the jacket wall.

11. The recuperator as claimed in claim 1, further comprising a bypass pipe for short-circuiting part of the cold air directly to the burner without passing via the recuperator as long as the radiant tube has not reached the self-ignition temperature of the fuel, with a shut-off member provided on the air intended for igniting the burner.

12. The recuperator as claimed in claim 1, wherein the plurality of exchanger tubes have different diameters, the diameter being greater in the upper part and smaller in the lower part.

13. The recuperator as claimed in claim 1, wherein each of the plurality of exchanger tubes is welded at just one end, the hot end connected to the ferrule, while at the other end they each of the plurality of exchanger tubes is engaged with a fluidtight sliding fit in an end wall of the exhaust pipe.

\* \* \* \* \*